US010928959B2

(12) United States Patent
Xu et al.

(10) Patent No.: US 10,928,959 B2
(45) Date of Patent: Feb. 23, 2021

(54) TOUCH SCREEN AND MANUFACTURING METHOD THEREOF, AND TOUCH DISPLAY DEVICE

(71) Applicants: BOE Technology Group Co., Ltd., Beijing (CN); Hefei Xinsheng Optoelectronics Technology Co., Ltd., Hefei (CN)

(72) Inventors: Jiawei Xu, Beijing (CN); Zhi Zhang, Beijing (CN); Qin Zeng, Beijing (CN); Xiao Han, Beijing (CN); Lei Zhang, Beijing (CN); Tsung Chieh Kuo, Beijing (CN)

(73) Assignees: BOE Technology Group Co., Ltd., Beijing (CN); Hefei Xinsheng Optoelectronics Technology Co., Ltd., Anhui (CN)

( * ) Notice: Subject to any disclaimer, the term of this patent is extended or adjusted under 35 U.S.C. 154(b) by 379 days.

(21) Appl. No.: 15/774,777

(22) PCT Filed: Sep. 27, 2017

(86) PCT No.: PCT/CN2017/103721
§ 371 (c)(1),
(2) Date: May 9, 2018

(87) PCT Pub. No.: WO2018/099174
PCT Pub. Date: Jun. 7, 2018

(65) Prior Publication Data
US 2020/0285330 A1    Sep. 10, 2020

(30) Foreign Application Priority Data

Nov. 29, 2016 (CN) .......................... 2016 1 1072244

(51) Int. Cl.
*G06F 3/044* (2006.01)

(52) U.S. Cl.
CPC .... *G06F 3/044* (2013.01); *G06F 2203/04103* (2013.01); *G06F 2203/04112* (2013.01)

(58) Field of Classification Search
CPC combination set(s) only.
See application file for complete search history.

(56) References Cited

U.S. PATENT DOCUMENTS

2014/0299361 A1* 10/2014 Nakamura ........... H05K 1/0296
174/253
2016/0209960 A1* 7/2016 Lee ........................ G06F 3/044
(Continued)

FOREIGN PATENT DOCUMENTS

| CN | 104461135 A | 3/2015 |
|----|-------------|--------|
| CN | 105094482 A | 11/2015 |

(Continued)

OTHER PUBLICATIONS

Jan. 4, 2018—(WO) International Search Report and Written Opinion Appn PCT/CN2017/103721 with English Tran.

*Primary Examiner* — Robin J Mishler
(74) *Attorney, Agent, or Firm* — Banner & Witcoff, Ltd.

(57) ABSTRACT

A touch screen and a manufacturing method thereof, and a touch display device are provided. The touch screen includes a plurality of touch electrodes and a plurality of first touch lines, the plurality of touch electrodes extending in a same direction, each of the plurality of touch electrodes including a mesh structure formed by a plurality of metal lines, and the touch electrode including a first end and extending from the first end, each of the plurality of first touch lines being located between two adjacent touch electrodes and electrically connected with one of the two adjacent touch electrodes, and the first touch line being electrically connected with the first end of the touch electrode.

19 Claims, 5 Drawing Sheets

(56) References Cited

U.S. PATENT DOCUMENTS

2016/0313828 A1* 10/2016 Yoshiki .................. G06F 3/044
2016/0328035 A1    11/2016 Zou
2016/0349874 A1* 12/2016 Hsu ...................... G06F 3/0412

FOREIGN PATENT DOCUMENTS

CN        105975123 A    9/2016
CN        106775066 A    5/2017

* cited by examiner

TOUCH SCREEN AND MANUFACTURING METHOD THEREOF, AND TOUCH DISPLAY DEVICE

CROSS-REFERENCE TO RELATED APPLICATIONS

The application is a U.S. National Phase Entry of International Application No. PCT/CN2017/103721 filed on Sep. 27, 2017, designating the United States of America and claiming priority to Chinese Patent Application No. 201611072244.6, filed on Nov. 29, 2016. The present application claims priority to and the benefit of the above-identified applications and the above-identified applications are incorporated by reference herein in their entirety.

TECHNICAL FIELD

At least one embodiment of the present disclosure relates to a touch screen and a manufacturing method thereof, and a touch display device.

BACKGROUND

In a touch screen with one glass solution (OGS) type, a touch screen with a metal mesh touch structure has a relatively low resistance compared to a common touch screen with a touch structure made of indium tin oxide (ITO) material. Especially in a large-size touch screen, the metal mesh touch screen can effectively reduce resistance and capacitance delay (RC Delay) and prevent electrostatic discharge (ESD).

SUMMARY

At least one embodiment of the disclosure provides a touch screen, a manufacturing method thereof, and a touch display device, which employ a wiring design in which touch lines are located in an active area (display area), thereby greatly reducing an area of the bezel occupied by the touch lines, and realizing a narrow bezel design.

At least one embodiment of the disclosure provides a touch screen. comprising:

a plurality of touch electrodes, extending in a same direction, each of the plurality of touch electrodes comprising a mesh structure formed by a plurality of metal lines, and the touch electrode comprising a first end and extending from the first end, a plurality of first touch lines, each of the plurality of first touch lines being located between two adjacent touch electrodes and electrically connected with one of the two adjacent touch electrodes, the first touch line being electrically connected with the first end of the touch electrode.

At least one embodiment of the disclosure provides a manufacturing method of a touch screen, comprising:

forming a plurality of touch electrodes and a plurality of first touch lines in a same layer on a base substrate, wherein, the plurality of touch electrodes extend in a same direction, each of the plurality of touch electrodes comprises a mesh structure formed by a plurality of metal lines, and the touch electrode comprises a first end and extends from the first end, each of the plurality of first touch lines is located between two adjacent touch electrodes and is electrically connected with one of the two adjacent touch electrodes, and the first touch line is electrically connected with the first end of the touch electrode.

At least one embodiment of the disclosure provides a touch display device, comprising any one of the touch screens provided by the embodiments of the disclosure.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to limit to a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

A mutual capacitance touch screen generally includes a plurality of touch sensing electrodes (Rx) and a plurality of touch driving electrodes (Tx). For example, the plurality of touch sensing electrodes (Rx) and the plurality of touch driving electrodes (Tx) are insulated from each other and intersected with each other. For a large-size metal mesh touch screen, the number of touch sensing electrodes (Rx) and touch driving electrodes (Tx) is increased. In addition, in a 2T2R driving manner, touch lines are provided on both sides of the Rx and Tx to improve the electrical performance, resulting in an increase in the number of the touch lines.

Figure 1:
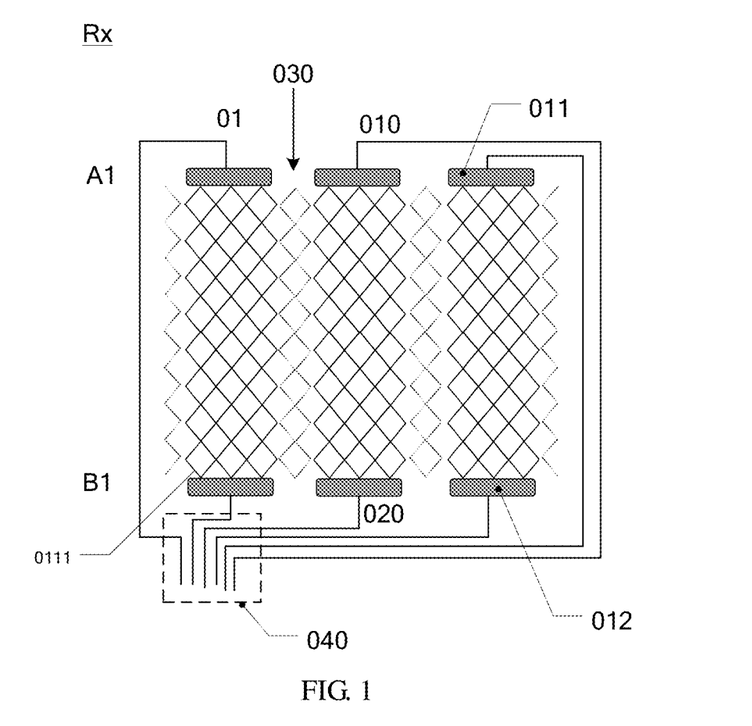
FIG. 1 is a schematic diagram of an Rx and a touch line of the Rx of a touch screen.
Figure 2:
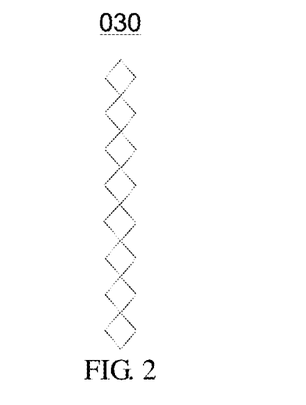
FIG. 2 is a schematic diagram of a dummy line of FIG. 1.

FIG. 1 illustrates a wiring manner of a metal mesh touch screen. FIG. 1 illustrates three touch electrodes 01 extending in the same direction. The number of the touch electrodes 01 is not limited to that illustrated in the figure. Each of the plurality of touch electrodes 01 includes a mesh structure formed by a plurality of metal lines 0111. Each of the plurality of touch electrodes 01 extends from a first end A1 to a second end B1. A dummy area is provided between two adjacent touch electrodes 01, and the dummy area is provided with a dummy line 030 extending in the same direction as the touch electrodes 01. The dummy line 030 includes two sawtooth-shaped lines connected with each other at top points to form a plurality of quadrilaterals. The dummy line 030 is insulated from the touch electrode 01 and continues a shape of the mesh structure of the touch electrode 01. The dummy line 030 can be as illustrated in FIG. 2. For example, a first connection electrode 011 and a second connection electrode 012 are respectively located at two ends of each of the plurality of touch electrodes 01. The first touch line 010 can be electrically connected with the touch electrode 01 through the first connection electrode 011, and the second touch line 020 can be electrically connected with the touch electrode 01 through the second connection electrode 012.

Figure 3:
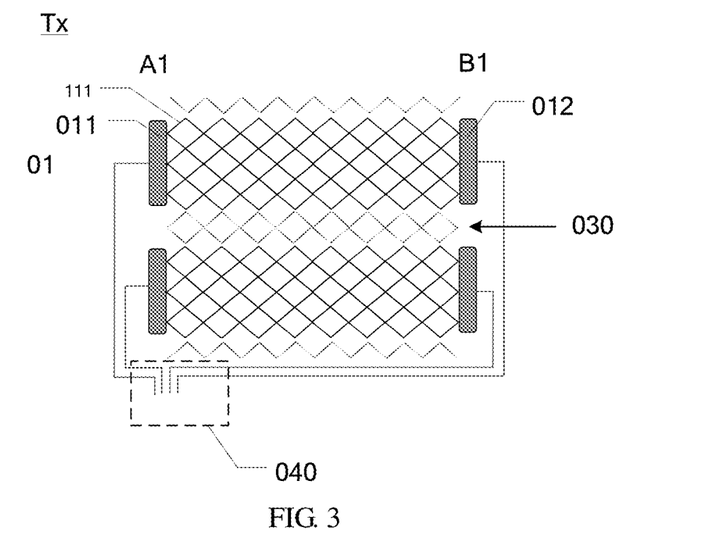
FIG. 3 is a schematic diagram of a Tx and a touch line of the Tx of a touch screen.

As illustrated in FIG. 1, the metal mesh touch screen employs an edge wiring manner. That is, the first touch line 010 of the touch electrode 01 is led from an edge to a fan-out region 040, and the second touch line 020 is also collected in the fan-out region 040. In the edge wiring manner, the touch lines occupy most area of a bezel. For a large-size metal mesh touch screen, it is difficult to achieve a narrow bezel by the edge wiring manner. For example, the touch electrode 01 illustrated in FIG. 1 is Rx. FIG. 3 illustrates a case where the touch electrode 01 is Tx, which can refer to the description of FIG. 1 and details are not described herein again.

At least one embodiment of the present disclosure provides a touch screen, including:

a plurality of touch electrodes, extending in the same direction, each of the plurality of touch electrodes including a mesh structure formed by a plurality of metal lines, and the touch electrode including a first end and extending from the first end, a plurality of first touch lines, each of the plurality of first touch lines being located between two adjacent touch electrodes and electrically connected with one of the two adjacent touch electrodes, and the first touch line being electrically connected with the first end of the touch electrode.

The touch screen, provided by at least one embodiment of the present disclosure, employs a wiring design in which touch lines are located in an active area, thereby reducing an area of the bezel occupied by the touch lines greatly, and realizing a narrow bezel design.

At least one embodiment of the present disclosure provides a manufacturing method of a touch screen, including: forming a plurality of touch electrodes and a plurality of first touch lines in the same layer on a base substrate, wherein the plurality of touch electrodes extend in the same direction and each of the plurality of touch electrodes includes a mesh structure formed by a plurality of metal lines, the touch electrode includes a first end and extends from the first end, each of the plurality of first touch lines being located between two adjacent touch electrodes and electrically connected with one of the two adjacent touch electrodes, and the first touch line being electrically connected with the first end of the touch electrode.

The manufacturing method of the touch screen, provided by the at least one embodiment of the present disclosure, employs a wiring design in which touch lines are located in an active area, thereby reducing an area of the bezel occupied by the touch lines greatly, and facilitating the manufacture of the touch screen with a narrow bezel. Forming the plurality of touch electrodes and the plurality of first touch lines in the same layer simplifies the manufacturing process.

At least one embodiment of the present disclosure provides a touch display device including any one of the touch screens provided by the embodiments of the present disclosure.

At least one embodiment of the present disclosure provides a touch display device. Because the touch display device includes any one of the touch screens provided by the embodiments of the present disclosure, a narrow bezel design can be realized.

In following, it is further described with reference to the embodiments and accompanying drawings.

Figure 4:
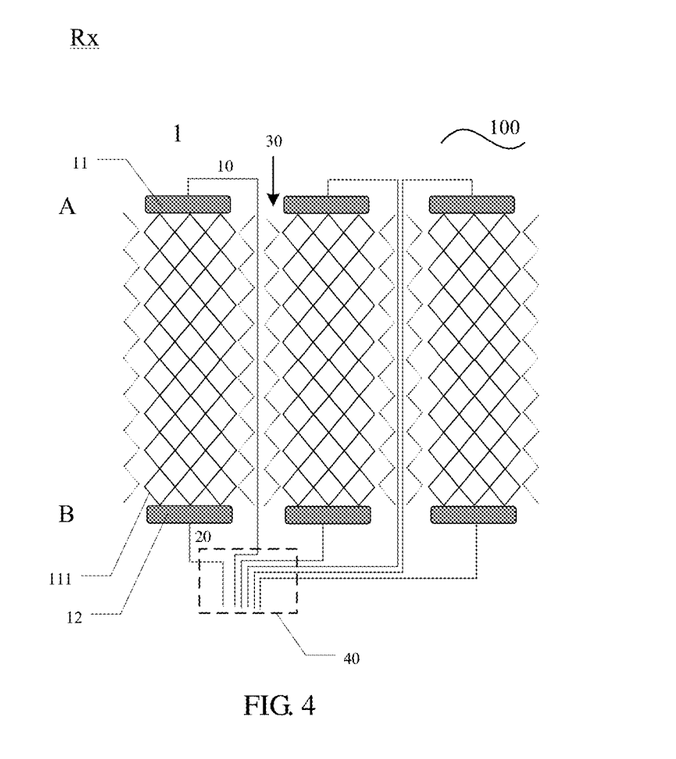
FIG. 4 is a schematic diagram of an Rx and a touch line of the Rx of a touch screen provided by an embodiment of the disclosure.

As illustrated in FIG. 4, an embodiment of the present disclosure provides a touch screen, including a base substrate 100, a plurality of touch electrodes 1 and a plurality of first touch lines 10 which are located on the base substrate 100, the plurality of touch electrodes 1 extend in the same direction. Each of the plurality of touch electrodes 1 includes a mesh structure formed by a plurality of metal lines 111. The touch electrode 1 includes a first end A and extends from the first end A. Each of the plurality of first touch lines 10 is located between two adjacent touch electrodes 1 and is electrically connected with one of the two adjacent touch electrodes 1. The first touch line 10 is electrically connected with the first end A of the first touch electrode 1. For example, the first ends A of the plurality of touch electrodes 1 are located on the same side of the base substrate 100. For example, the touch electrode can also be referred to as a touch channel. For example, a portion of the first touch line 10 located between the two adjacent touch electrodes 1 extends in the same direction as the touch electrode 1.

The touch screen, provided by the embodiment of the present disclosure, employs a wiring design in which touch lines are located in an active area, thereby reducing the area of the bezel occupied by the touch lines greatly to achieve a narrow bezel design.

Figure 5:
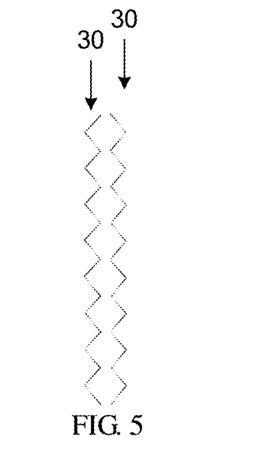
FIG. 5 is a schematic diagram of two dummy lines between two adjacent touch electrodes of FIG. 4.
Figure 6:
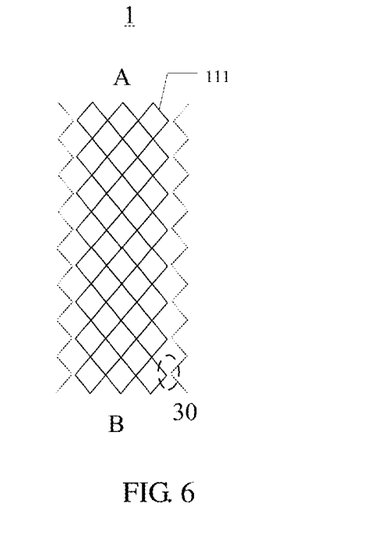
FIG. 6 is a schematic diagram illustrating that a touch electrode (Rx) and a dummy line are insulated from each other in a touch screen provided by an embodiment of the present disclosure.

In an example, in order to reduce signal interference to the touch electrodes caused by wiring touch lines in active area, as illustrated in FIG. 4, two dummy lines extending in the same direction as the touch electrodes 1 are located between the two adjacent touch electrodes 1. The arrangement of the dummy line 30 can effectively shield the signal interference of the touch electrodes caused by wiring touch lines in active area. The dummy lines 30 can be as illustrated in FIG. 5. For example, as illustrated in FIG. 4, the first touch line 10 is located between the two dummy lines 30 and insulated from the two dummy lines 30 (equivalent to pulling apart left portion and right portion of the dummy line between the two adjacent touch electrodes illustrated in FIG. 2). For example, the dummy line 30 can continue a shape of the mesh structure of the touch electrode 1, and the dummy line 30 and the touch electrode 1 are insulated from each other. For example, that the dummy line 30 continues the shape of the mesh structure of the touch electrode 1 refers to the shape of the dummy line 30 is a shape of a portion of the mesh structure of the touch electrode 1 close thereto. For example, the dummy line 30 is in axisymmetric with a portion of the mesh structure of the touch electrode 1 close thereto. For example, the mesh structure formed by the metal lines 111 and the dummy line 30 can be formed in the same layer. In the dashed frame of FIG. 6, the dummy line 30 has a distance from the touch electrode 1 and is insulated from the touch electrode 1.

For example, as illustrated in FIG. 4, the touch electrode 1 further includes a second end B. The touch electrode 1 extends from the first end A to the second end B. For example, the second ends B of the plurality of touch electrodes 1 are located on the same side of the base substrate 100. For example, the second end B is opposite to the first end A. The second end B of each of the plurality of touch electrodes 1 is electrically connected with a second touch line 20. The arrangement of two touch lines for one touch electrode (first touch line 10 and second touch line 20) facilitates signal driving and receiving.

For example, as illustrated in FIG. 4, the first end A of the touch electrode 1 is electrically connected with the first touch line 10 through the first connection electrode 11, and the second end B of the touch electrode 1 is electrically connected with the second touch line 20 through the second connection electrode 12. For example, the touch electrode 1, the first connection electrode 11, the first touch line 10, the second connection electrode 12, and the second touch line 20 can be formed in the same layer.

For example, the touch screen further includes a fan-out region 40. The plurality of first touch lines 10 and the plurality of second touch lines 20 are collected in the fan-out region 40. For example, the plurality of first touch lines 10 and the plurality of the second touch lines 20 are electrically connected with an external circuit at the fan-out region 40 after being collected. For example, the plurality of first touch lines 10 and the plurality of the second touch lines 20 are electrically connected with a drive IC at the fan-out region 40 after being collected.

In an example, in order to avoid visual issue caused by the providing of the touch lines in an active area, and realize pattern invisibility of the touch lines in the active area, as illustrated in FIG. 4, one first touch line 10 is located between two adjacent touch electrodes 1. The first touch lines 10 are evenly distributed and are not easily recognized by the human eyes, so that a good pattern invisibility effect can be obtained. For example, each of the first touch lines 10 of each of the plurality of touch electrodes 1 extends from the right side of the touch electrode 1. Of course, the first touch line 10 of the touch electrode 1 can also extend from the left side of the touch electrode 1. FIG. 4 is a schematic description illustrating only part of the structure of the touch screen. Of course, the touch screen provided by the example can further include a portion where two first touch lines 10 are located between two adjacent touch electrodes 1. For example, a portion where two first touch lines 10 are located between two adjacent touch electrodes 1 is located on an edge of the touch screen to further narrow the bezel. Of course, it can be not provided on the edge of the touch screen, for example, it is provided in a middle of the touch screen etc. This is not limited by the embodiment of the present disclosure.

Figure 7:
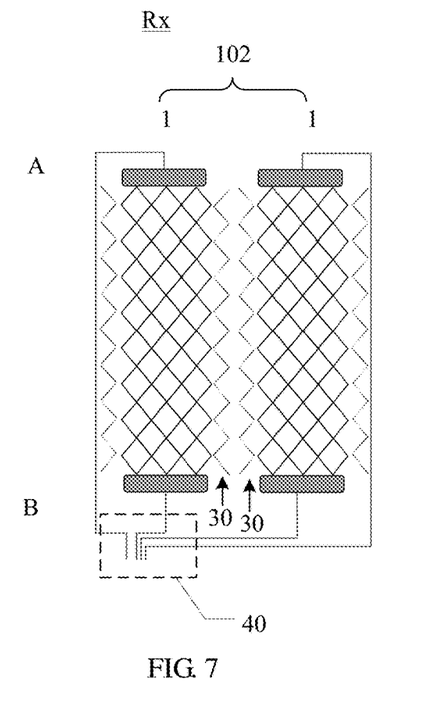
FIG. 7 is a schematic diagram of an Rx and a touch line of the Rx of another touch screen provided by an embodiment of the disclosure.
Figure 8:
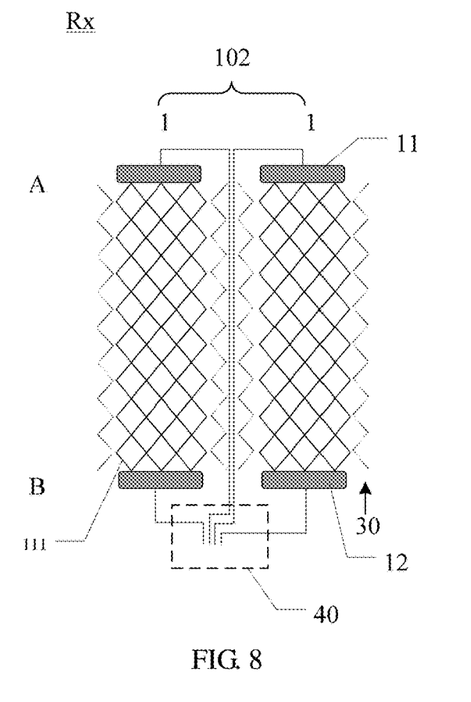
FIG. 8 is a schematic diagram of an Rx and a touch line of the Rx of another touch screen provided by an embodiment of the disclosure.

In an example, as illustrated in FIG. 7 and FIG. 8, two adjacent touch electrodes 1 form a group and constitute a touch electrode group 102. Moreover, any of two adjacent touch electrode groups 102 are not overlapped with each other (each of the plurality of touch electrodes 1 belongs to only one touch electrode group 102). Two first touch lines 10, which are electrically connected with two adjacent touch electrodes 1 in one touch electrode group 102 respectively, are located between the two adjacent touch electrodes 1 of the touch electrode group 102 (or located on both sides of the touch electrode group 102). Only a part of the structure of the touch screen is illustrated in FIG. 7 and FIG. 8, and the structure illustrated in FIG. 7 or FIG. 8 can be sequentially arranged along a horizontal direction to form a touch structure. FIG. 7 and FIG. 8 can be schematic diagrams of different parts of a touch structure.

The case where the touch electrode 1 is a touch sensing electrode Rx is illustrated above as an example. Of course, a similar structure can also be adopted for a touch driving electrode Tx.

Figure 9:
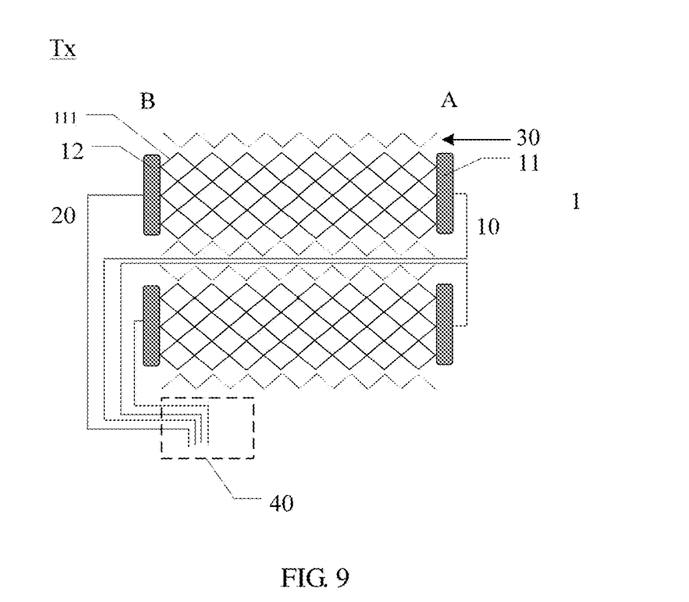
FIG. 9 is a schematic diagram of a Tx and a touch line of the Tx of a touch screen provided by an embodiment of the disclosure.
Figure 10:
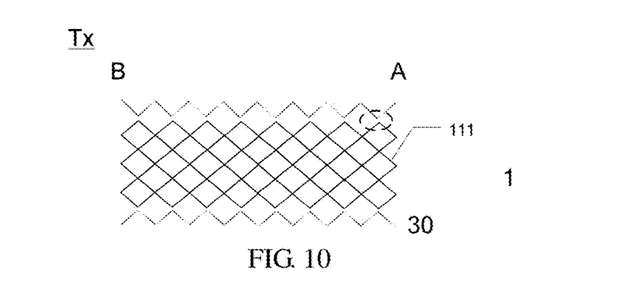
FIG. 10 is a schematic diagram illustrating that a touch electrode (Tx) and a dummy line are insulated from each other in a touch screen provided by an embodiment of the disclosure.

In an example, in a case that a touch line of Rx adopts the structure as illustrated in FIG. 4 to FIG. 8 as described above, a touch line of Tx can adopt the structure illustrated in FIG. 9. That is, Tx also employs the manner of wiring a touch line in active area. FIG. 10 illustrates that in the case where a dummy line 30 is provided between Txes the dummy line 30 and the touch electrode 1 are insulated from each other (not electrically connected). For example, the dummy line 30 continues the shape of the metal mesh. Two dummy lines 30 between the two adjacent touch electrodes 1 are insulated from each other. In this example, touch lines for Tx and Rx go through the dummy areas of Tx and Rx respectively, and are provided in active area, thereby reducing the number of touch lines in edge region and achieving a narrow bezel design.

Figure 11:
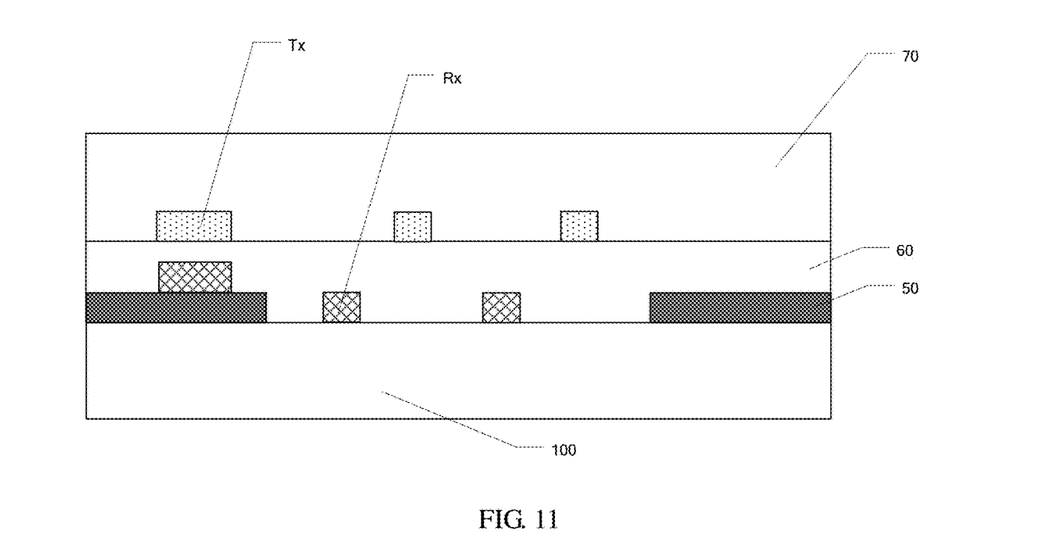
FIG. 11 is a schematic diagram of a touch screen provided by an embodiment of the disclosure.

For example, as illustrated in FIG. 11, the touch screen can further include a black matrix 50 to reduce light leakage, and the black matrix 50 can be located on a periphery of the touch screen. FIG. 11 also illustrates the black matrix 50 is provided on the base substrate 100. A first optical adhesive layer 60 is located between the touch sensing electrode Rx and the touch driving electrode Tx, and a second optical adhesive layer 70 is further located on the touch driving electrode Tx. The first optical adhesive layer 60 and the second optical adhesive layer 70 can be optical clear adhesives, and play a role of insulation, adhesion, and protection. The first optical adhesive layer 60 and the second optical adhesive layer 70 can also be replaced with other insulating materials.

Of course, Tx can also not adopt the structure illustrated in FIG. 9. This is not limited by the embodiments of the present disclosure. For example, the fan-out region 40 of the Tx can also be provided on the left side of FIG. 9 to further reduce the number of touch lines in the edge region and further reduce the bezel.

An embodiment of the present disclosure provides a manufacturing method of a touch screen, including: forming a plurality of touch electrodes 1 and a plurality of first touch lines 10 in the same layer on a base substrate 100.

The plurality of touch electrodes 1 extend in the same direction, and each of the plurality of touch electrodes 1 includes a mesh structure formed by a plurality of metal lines 111. The touch electrode 1 includes a first end A and extends from the first end A.

Each of the plurality of first touch lines 10 is located between two adjacent touch electrodes 1 and is electrically connected with one of the two adjacent touch electrodes 1. The first touch line 10 is electrically connected with the end A of the first touch electrode 1.

The manufacturing method of the touch screen, provided by the embodiment of the present disclosure, employs a design of wiring touch lines in an active area, thereby reducing the area of the bezel occupied by the touch lines greatly, facilitating manufacture of a touch screen with a narrow bezel. Forming a plurality of touch electrodes and a plurality of first touch lines in the same layer simplifies the manufacturing process.

For example, the plurality of touch electrodes 1 and the plurality of first touch lines 10 can be formed by the same patterning process, for example, using a nano-imprint or photolithography process. For example, the plurality of touch electrodes 1 and the plurality of first touch lines 10 can be formed by the same metal layer through a photolithography process.

For example, the manufacturing method can further include forming two dummy lines 30 between two adjacent touch electrodes 1, the two dummy lines 30 extend in the same direction as the touch electrodes 1. The first touch line 10 is formed between two dummy lines 30, and is insulated from the two dummy lines 30. For example, the touch electrode 1, the first touch line 10, and the dummy line 30 can be formed in the same layer.

For example, the manufacturing method can further include forming a second touch line 20, a first connection electrode 11, and a second connection electrode 12. The touch electrode 1 further includes a second end B. The touch electrode 1 extends from the first end A to the second end B. The first end A of the touch electrode 1 is electrically connected with the first touch line 10 through the first connection electrode 11, and the second end B of the touch electrode 1 is electrically connected with the second touch line 20 through the second connection electrode 12. For example, the touch electrode 1, the first touch line 10, the second touch line 20, the first connection electrode 11 and the second connection electrode 12 can be formed in the same layer by the same patterning process.

In an example, a manufacturing method of a touch screen includes the following steps.

(1) Forming a black matrix (a black frame made of photoresist) on a periphery of a base substrate 100 by a photolithography process.

(2) Forming a touch sensing electrode Rx and a touch line thereof (by a manner of wiring touch line in active area); for example, a metal mesh structure of Rx and the touch line of Rx can be formed by forming a metal layer by magnetron sputtering, photoresist coating, exposing, developing, and etching. For example, the touch line includes the first touch line and the second touch line. For example, the first connection electrode and the second connection electrode can also be formed in the same layer.

(3) Coating optical adhesive material, exposing, and developing to form a first optical adhesive layer (an insulation layer).

(4) Forming a touch driving electrode Tx and a touch line thereof (by a manner of wiring touch line in active area). The specific process is the same as the method of forming the Rx and the touch line thereof.

(5) Coating optical adhesive material, exposing, and developing to form a second optical adhesive layer (an insulation layer).

Any one of the touch screens described in the first embodiment can be formed by the method of the embodiments of the present disclosure. The structure of the touch screen manufactured by this method will not be described in detail here, please refer to the description of the first embodiment.

An embodiment of the present disclosure provides a touch display device including any one of the touch screens of the above embodiments.

For example, the touch display device includes a television, a digital camera, a mobile phone, a watch, a tablet computer, a laptop, a navigator, and the like.

The embodiments of the present disclosure are described with reference to the case where Rx extends in the vertical direction and Tx extends in the horizontal direction, by way of example. However, Rx and Tx can also be interchanged, that is, Rx extends in the horizontal direction and Tx extends in the vertical direction. The embodiments of the present disclosure are not limited thereto. Also, forming sequence of Tx and Rx is not limited by the embodiment of the present disclosure.

The embodiments of the present disclosure are described with reference to a case of forming a one glass solution (OGS) touch screen, by way of example. However, it is not limited to this, for example, any one of an In-Cell touch panel or an On-Cell touch panel can also be formed.

Herein, it should be understood that, in the embodiments of the present disclosure, "same layer" refers to a layer structure formed by using the same film forming process to form a film with a specific pattern and then using one patterning process with the same mask. Depending on the specific pattern, a patterning process can include a multiple of exposing, developing, or etching processes. The specific pattern in the formed layer structure can be continuous or discontinuous. These specific patterns can also be at different heights or have different thicknesses.

In the embodiments of the present disclosure, the patterning or patterning process can include only a photolithography process, or include a photolithography process and an etching process, or can include other processes for forming a predetermined pattern, such as printing, inkjet, and the like. The photolithography process includes the process, such as film forming, exposing, developing, and the like, to form a pattern by using photoresist, a mask, an exposure machine, and the like. The corresponding patterning process can be selected according to the structure formed in the embodiments of the present disclosure.

The following statements should be noted:

(1) Unless otherwise defined, the same reference numeral refers to the same meaning in the embodiments of the disclosure and accompanying drawings.

(2) The accompanying drawings involve only the structure(s) in connection with the embodiment(s) of the present disclosure, and other structure(s) can be referred to common design(s).

(3) For the purpose of clarity only, in accompanying drawings for illustrating the embodiment(s) of the present disclosure, the thickness and size of a layer or a structure can be enlarged. However, it should understood that, in the case in which a component or element such as a layer, film, area, substrate or the like is referred to be "on" or "under" another component or element, it can be directly on or under the another component or element or a component or element is interposed there between.

(4) In case of no conflict, features in one embodiment or in different embodiments can be combined.

What have been described above are only specific implementations of the present disclosure, the protection scope of the present disclosure is not limited thereto. Any changes or substitutions easily occur to those skilled in the art within the technical scope of the present disclosure should be covered in the protection scope of the present disclosure. Therefore, the protection scope of the present disclosure should be based on the protection scope of the claims.

What is claimed is:

1. A touch screen, comprising:
    a plurality of touch electrodes, extending in a same direction, each touch electrode of the plurality of touch electrodes comprising a mesh structure formed by a plurality of metal lines, and the touch electrode comprising a first end and extending from the first end,
    a plurality of first touch lines, each first touch line of the plurality of first touch lines being located between two adjacent touch electrodes and electrically connected with a corresponding one of the two adjacent touch electrodes, the first touch line being electrically connected with the first end of the touch electrode,
    wherein the two adjacent touch electrodes constitute a touch electrode group, and two adjacent touch electrode groups are not overlapped with each other, and two first touch lines which are electrically connected with the two adjacent touch electrodes in one touch electrode group are located between the two adjacent touch electrodes of the touch electrode group,
    wherein the two first touch lines are insulated from each other.

2. A touch screen, comprising:
    a plurality of touch electrodes, extending in a same direction, each touch electrode of the plurality of touch electrodes comprising a mesh structure formed by a plurality of metal lines, and the touch electrode comprising a first end and extending from the first end,
    a plurality of first touch lines, each first touch line of the plurality of first touch lines being located between two adjacent touch electrodes and electrically connected with a corresponding one of the two adjacent touch electrodes, the first touch line being electrically connected with the first end of the touch electrode,
    wherein two dummy lines extending in a same direction as the touch electrodes are located between the two adjacent touch electrodes,
    wherein the first touch line is located between the two dummy lines and insulated from the two dummy lines.

3. The touch screen according to claim 1, wherein two dummy lines extending in a same direction as the touch electrodes are located between the two adjacent touch electrodes.

4. The touch screen according to claim 2, wherein two adjacent touch electrodes constitute a touch electrode group, and two adjacent touch electrode groups are not overlapped with each other, and two first touch lines which are electrically connected with two adjacent touch electrodes in one touch electrode group are located between the two adjacent touch electrodes of the touch electrode group.

5. The touch screen according to claim 3, wherein each dummy line of the two dummy lines continues a shape of the mesh structure of the touch electrode, and the dummy line and the touch electrode are insulated from each other.

6. The touch screen according to claim 1, wherein the touch electrode further comprises a second end, wherein the touch electrode extends from the first end to the second end, and the second end of the touch electrode is electrically connected with a second touch line.

7. The touch screen according to claim 1, further comprising a fan-out region, wherein the plurality of first touch lines and the second touch line are collected in the fan-out region.

8. The touch screen according to claim 6, wherein the first end of the touch electrode is electrically connected with the first touch line through a first connection electrode, and a second end of the touch electrode is electrically connected with the second touch line through a second connection electrode.

9. The touch screen according to claim 1, wherein the touch electrode comprises at least one of a touch driving electrode and a touch sensing electrode.

10. A manufacturing method of a touch screen, comprising:
    forming a plurality of touch electrodes and a plurality of first touch lines in a same layer on a base substrate, wherein,
    the plurality of touch electrodes extend in a same direction, each touch electrode of the plurality of touch electrodes comprises a mesh structure formed by a plurality of metal lines, and the touch electrode comprises a first end and extends from the first end,
    each first touch line of the plurality of first touch lines is located between two adjacent touch electrodes and is electrically connected with one of the two adjacent touch electrodes, and the first touch line is electrically connected with the first end of the touch electrode,
    wherein the manufacturing method of the touch screen further comprises: forming two dummy lines between the two adjacent touch electrodes, wherein the two dummy lines extend in a same direction as the touch electrode, the first touch line is formed between the two dummy lines and is insulated from the two dummy lines.

11. The manufacturing method of the touch screen according to claim 10, further comprising: forming a second touch line, a first connection electrode, and a second connection electrode, wherein the touch electrode further comprises a second end, and the touch electrode extends from the first end to the second end, the first end of the touch electrode is electrically connected with the first touch line through the first connection electrode, and the second end of the touch electrode is electrically connected with the second touch line through the second connection electrode.

12. The manufacturing method of the touch screen according to claim 11, wherein the touch electrode, the first touch line, the second touch line, the first connection electrode, and the second connection electrode are formed in a same layer by a same patterning process.

13. A touch display device, comprising the touch screen according to claim 1.

14. The touch screen according to claim 3, wherein an interval is provided between the two dummy lines in a direction perpendicular to an extending direction of the touch electrode.

15. The touch screen according to claim 14, wherein each of the two dummy lines is in a sawtooth shape.

16. The touch screen according to claim 3, wherein the two first touch lines pass through a space between the two dummy lines.

17. The touch screen according to claim 2, wherein an interval is provided between the two dummy lines in a direction perpendicular to an extending direction of the touch electrode.

18. The touch screen according to claim 17, wherein each of the two dummy lines is in a sawtooth shape.

19. The touch screen according to claim 2, T wherein two first touch lines of two adjacent touch electrodes pass through a space between the two dummy lines.

* * * * *

UNITED STATES PATENT AND TRADEMARK OFFICE
CERTIFICATE OF CORRECTION

PATENT NO. : 10,928,959 B2
APPLICATION NO. : 15/774777
DATED : February 23, 2021
INVENTOR(S) : Xu et al.

Page 1 of 1

It is certified that error appears in the above-identified patent and that said Letters Patent is hereby corrected as shown below:

In the Claims

Column 10, Claim 7, Line 8:
Delete "claim 1", insert --claim 6--

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*